Aug. 25, 1942. H. REHM ET AL 2,294,206
SOUND TRANSMITTING MEANS FOR AIRCRAFT SONIC ALTIMETERS
Filed May 28, 1938 2 Sheets-Sheet 1
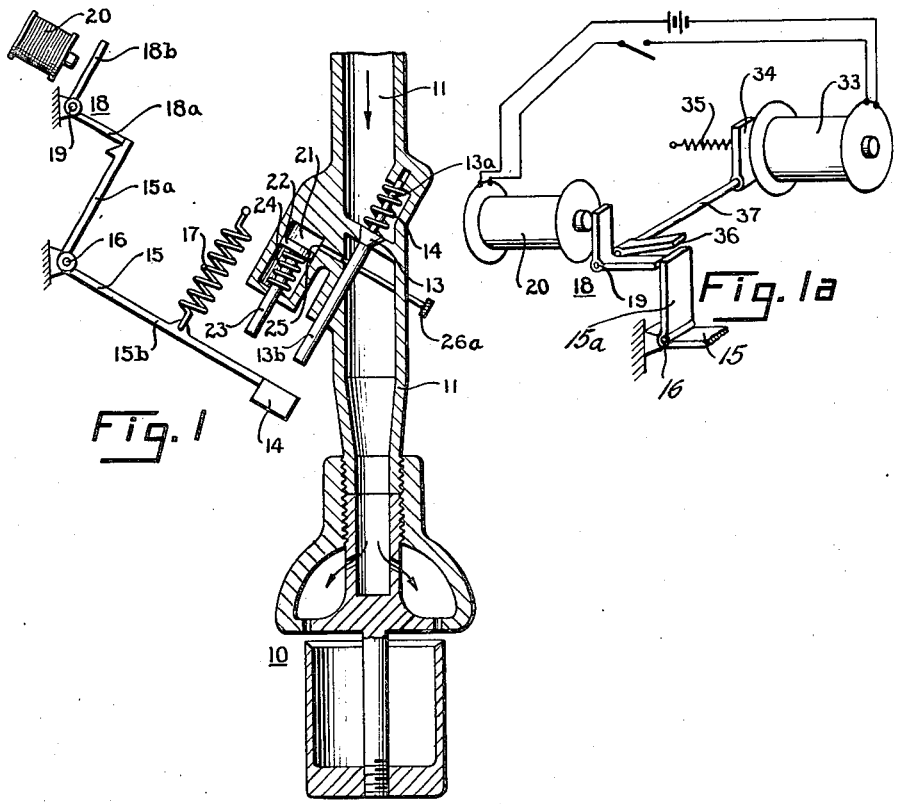
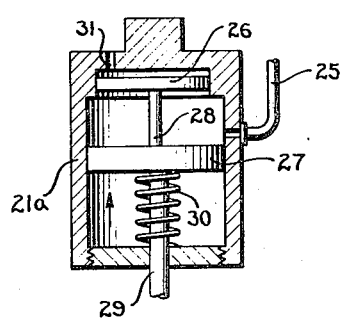
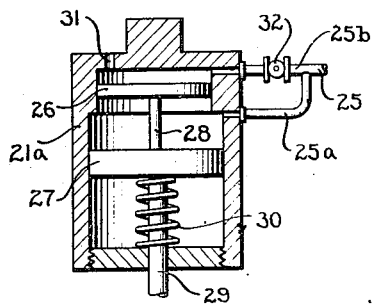
INVENTORS.
Helmut Rehm
Hans Schuchmann
BY Stephen Cerstvik
ATTORNEY.

Aug. 25, 1942.   H. REHM ET AL   2,294,206
SOUND TRANSMITTING MEANS FOR AIRCRAFT SONIC ALTIMETERS
Filed May 28, 1938   2 Sheets-Sheet 2

INVENTORS
Helmut Rehm
Hans Schuchmann
BY Stephen Cerstvik
ATTORNEY.

Patented Aug. 25, 1942

2,294,206

UNITED STATES PATENT OFFICE 2,294,206

SOUND TRANSMITTING MEANS FOR AIRCRAFT SONIC ALTIMETERS

Helmut Rehm and Hans Schuchmann, Berlin-Charlottenburg, Germany, assignors to Siemens Apparate und Maschinen Gesellschaft mit beschrankter Haftung, Berlin, Germany, a corporation of Germany Application May 28, 1938, Serial No. 210,800
In Germany December 21, 1934

7 Claims. (Cl. 177—8)

This invention relates to sound transmitting means, and more particularly to means adapted for use in association with aircraft sonic altimeters, for transmitting a sound impulse and governing the duration thereof.

In measuring the duration of sound impulses in sonic altimeter arrangements, consideration must be given to the time interval which is to be measured, i. e., the interval between transmission and reception of a sound impulse. The shorter this interval is, the shorter must be the duration of the sound impulse. If particularly low altitudes are to be measured, as is the case when the aircraft is landing, the duration of the sound impulses must be proportionately short. If the same sonic altimeter arrangement is used for measuring both very short and very long time intervals, i. e., both low and high altitudes, it is advantageous that the duration of signal or sound impulse be adjustable.

Signal transmitting arrangements heretofore proposed of this character have failed to provide means for adjusting the duration of the signal or have been too complicated in construction.

One of the objects of the present invention is to provide novel means of the above character wherein a sound impulse of adjustable duration may be produced.

An additional object of the invention is to provide novel means of the above character whereby sound impulses may be produced which are of such duration that at low altitudes they do not overlap.

A further object is to provide novel sound impulse governing means which are simple in construction.

Another object is to provide novel signal impulse governing means for use with sonic altimeters which means enable accurate altitude measurement at both high and low altitudes.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views, Fig. 1 is a side elevation, partly in section, of one embodiment of the present invention;

Fig. 1a is a trigger releasing arrangement which may be employed with the first embodiment;

Fig. 2 is a side elevation, partly in section, of means which may be employed in the first embodiment for closing the valve of the device;

Fig. 3 is a side elevation, partly in section, of another form of means which may be employed in the first embodiment for closing the valve of the device;

Figure 4:
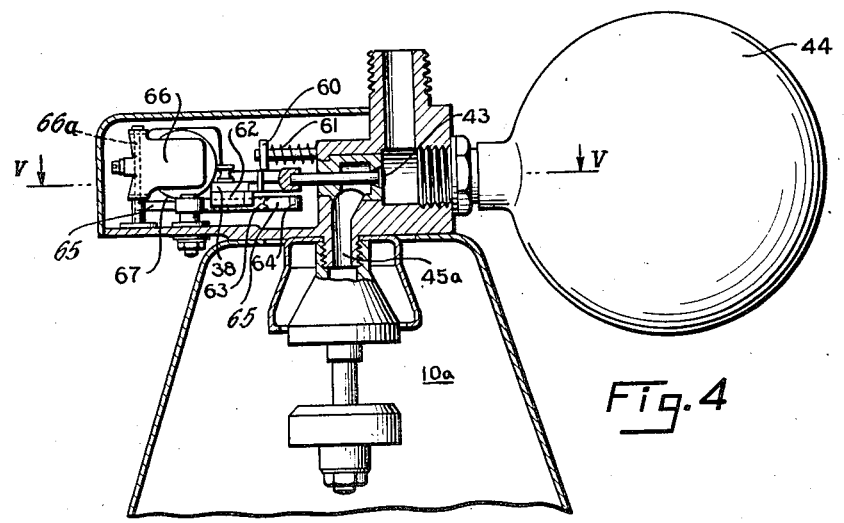
Fig. 4 is a sectional view taken on line IV—IV of Fig. 5 showing a second embodiment of the invention.

The form of the invention illustrated in the accompanying drawings by way of example is a device adapted for use with sonic altimeters for aircraft whereby a sound impulse of adjustable duration may be produced. The apparatus comprises sounding means such as a whistle which is sounded by a fluid pressure medium which, in turn, is governed by a suitable spring loaded valve. Means are provided for lifting the valve, which, in the form shown, are constituted by a spring loaded lever which may be held by a suitable trigger arrangement. The flow of the pressure medium when the valve is lifted is effective to actuate means for returning the valve lifting arrangement to its initial position. By providing a device for regulating the flow of said medium to the return means, the duration of the sound impulse may be adjusted.

In the form shown in Fig. 1, a sound impulse producing means is constituted by a whistle 10 which is in communication, by means of a conduit 11, with a suitable vessel (not shown) containing a fluid medium under pressure or with any source of fluid under pressure. A valve 13 is located in the conduit 11, the valve having shafts 13a and 13b extending from the upper and lower faces thereof, respectively. A coil spring 14 surrounding shaft 13a normally holds valve 13 in the closed position. Valve shaft 13b extends through a bore, having suitable packing (not shown) in conduit 11. The free end of said shaft which protrudes from said bore is situated opposite a hammer 14 which is mounted upon a hammer lever 15 having arms 15a and 15b. Lever 15 is pivotally mounted at 16 where said arms are joined. A form of energy storing means, for example, a draw spring 17, is attached to arm 15b which tends to angularly shift the lever in a counter-clockwise direction towards the valve shaft 13b. The spring is held in a stretched position and the lever is prevented from moving by a latch or trigger portion 18, also in the form of an angle lever, having arms 18a and 18b and pivotally mounted at 19 whereby the hammer lever 15 is maintained in cocked position. Arm 18b constitutes an armature for an electromagnet 20 which may be energized by connection to a suitable energy source (not shown) whereby arm 15a is released and the hammer lever 15 moves away from its cocked position.

Means are provided for returning the hammer lever to the cocked position and thus charging the energy storing means, comprising (Fig. 1) a piston arrangement actuated by the pressure agent which flows when the valve 13 is open. The arrangement comprises a cylinder 21 which may be formed integrally with conduit 11. A piston 22 having a rod 23 is movable within cylinder 21 and is normally held adjacent one extremity thereof by a spring 24; the rod 23, however, extends from said cylinder through a suitable central bore in one extremity thereof. The cylinder 21 at a point above piston 22 is in communication with conduit 11 at a point below valve 13, i. e., between the valve 13 and the whistle 10, by means of a conduit 25.

In order that the duration of the sound impulses may be controlled, means are provided for regulating the period during which valve 13 remains open comprising means for adjusting the flow of pressure medium in conduit 25 to the arrangement for returning lever 15 to the cocked position. The means are constituted, in the form shown, by a needle valve 26a which controls the size of the orifice at the mouth of conduit 25. The needle valve 26a may be moved by suitable manually operable means (not shown).

In operation, the electromagnet 20 is momentarily energized, armature 18b is attracted which displaces the trigger 18a. Lever 15 is released and immediately drawn by spring 17 in a counter-clockwise direction, whereby the hammer portion 14 at the extremity of arm 15b strikes the valve rod 13b opening valve 13 against the pressure of spring 14. The pressure medium, therefore, passes the valve and sounds whistle 10. A small quantity of the pressure medium, however, passes through conduit 25 and forces piston 22 downwards against the pressure of spring 24 whereby piston rod 23 engages lever arm 15b and forces the same in a clockwise direction against the pressure of draw spring 17 to the cocked position of hammer lever 15. The valve 13 is forced towards its seat by the action of spring 14. When seated, the valve is held by the combined pressures of said spring and the pressure medium. The period which is required to reseat the valve 13 after it has been opened is a function of the flow of pressure medium to cylinder 21, which flow is regulated by needle valve 26a.

In the arrangement for returning lever 15 to its initial position shown in Fig. 1, the motion of the piston 22 is substantially uniform. Consequently, there is a corresponding closing motion of valve 13. It may be desired that the closing motion of valve 13 occur slowly at first and then rapidly. Return means are provided for accomplishing this, as shown in Figs. 2 and 3, each of which may replace the return means shown in Fig. 1. The remaining parts of this embodiment remain unchanged.

In Fig. 2, a cylinder 21a has two concentric bores of different cross-sectional areas, the upper bore having the smaller area of the two. A double piston member comprising pistons 26 and 27 which are rigidly interconnected by a central rod 28, fit into the smaller and larger bores, respectively. Attached to piston 27 is a main rod 29 which extends through a central bore in an end plate of said cylinder. A coil spring 30 surrounds main rod 29 and yieldingly urges the two pistons in the direction of the arrow. In order to prevent a vacuum from forming above piston 26 when the arrangement is moved against the pressure of spring 30, a small air vent 31 is provided in an upper end plate adjacent piston 26. The cylinder is in communication with conduit 11 by means of the channel 25 which enters the cylinder between pistons 26 and 27.

In operation, when a pressure agent enters the cylinder, it tends to force the piston 26 in one direction and the piston 27 in an opposite direction. Since the latter piston has the greater area of the two, the double pistons move slowly downwardly against spring 30 in response to the difference in the forces acting thereon. As soon, however, as piston 26 moves into the larger of the two bores, the effective pressure is no longer a function of the difference of the forces acting on said pistons but is equal to the actual pressure of the agent in the cylinder. Consequently, the double pistons move rapidly against the pressure of spring 30.

The length of the piston rod 29 can be chosen, if desired, so that its free extremity does not contact the lever 15b until after piston 26 has moved into the larger bore, but the free extremity may also be of such length that it contacts said lever immediately after valve 13 is opened. If the free extremity of rod 29 engages lever 15b immediately after valve 13 is opened, said valve closes with a motion which at first is slow, but when small piston 26 emerges from its small bore, the motion becomes rapid and hammer lever 15 is quickly moved into the cocked position.

In order to obtain a refined adjustment of the speed of the double piston arrangement while small piston 26 remains in its small bore, and to provide added means for controlling the duration of sound impulses, the conduit 25 as illustrated in Fig. 3, is divided into two branches 25a, and 25b (Fig. 3). The former branch enters the cylinder 21a between pistons 26 and 27; the latter branch enters the cylinder above piston 26, i. e., between the cylinder head and said piston. In conduit 25b a throttle valve 32 is provided for regulating the flow of the pressure agent. The return arrangement shown in Fig. 3 with the exception of the above-described throttle valve attachment is similar to that shown in Fig. 2.

The operation of the return means illustrated in Fig. 3 is similar to that of the means shown in Fig. 2, with the exception that by adjustment of valve 32 it is possible to govern the proportion of the pressures acting upon the two faces of piston 26, and thereby to govern the total force acting on the two pistons and hence the speed thereof. The speed control by valve 32, however, is effective only while piston 26 is within the smaller bore.

If, in the first embodiment, the electromagnet 20 is still excited after the return of lever 15 to the position shown, then the series of events is repeated, i. e., the opening and closing of valve 18 reoccurs. It is, therefore, possible that a plurality of sound impulses may be produced in rapid succession. In order to prevent this, the period of excitation of the electromagnet must be as short as possible. However, it is not always possible to excite the magnet for a sufficiently short period. Consequently, there is provided for association with magnet 20 a second electromagnet 33 (Fig. 1a) which may be connected in series or in parallel therewith. The action of the second magnet may be, for a purpose to appear later, retarded by suitable means for a fraction of a second. An armature 34 is provided, which is normally withdrawn from said second electromagnet by a spring 35 so that upon simultaneous energization of both magnets 20 and 33, armature 18 is moved first and armature 34 momentarily thereafter since the latter armature movement is retarded somewhat by spring 35. Armature 34 pivots coaxially with armature 18 and positions a second trigger portion 36 which is adjacent trigger 18a and is attached to member 34 by a rod 37. Portion 36 does not engage lever 15a when the electromagnets are deenergized.

In the operation of the double trigger arrangement, the electromagnets are connected to a suitable energy source. Magnet 20 attracts armature 18, thus releasing lever 15. The attraction of magnet 33 is retarded a sufficient length of time to permit the release of said lever. If the magnets are still energized when lever 15 returns to its initial position, trigger 18 will not engage said lever but trigger 36 which in the meantime has moved into an obstructing position, will do so. If the two electromagnets are deenergized thereafter, trigger 18 will move into the obstructing position and the second trigger 36 will be disengaged by spring 35.

In the embodiment shown in Figs. 4 to 7, a third novel form of the apparatus is provided. A lever 38 of this embodiment corresponds to lever 15 of Fig. 1. Lever 38 is pivotally mounted at 39 and yieldingly urged in a counter-clockwise direction by a spring 40. Intermediate the extremities of said lever is a weighted lug 41 which is positioned so as to strike a valve rod 42 of a valve 43 which controls the flow of a pressure agent from a container 44. Valve 43 is resiliently urged towards the closed position by a spring (not shown). A conduit 45 is provided on the exhaust side of valve 43 which leads into a cylinder 46 having a removable inner sleeve portion 47 in which moves a piston 48 having a rod 49, the piston being yieldingly urged toward a cylinder head 50 by a spring 51. Rod 49 extends through a suitable end plate and is adapted for striking a lug 53 upon the lever 38 and for moving the same in a clockwise direction.

A suitable whistle 10a or other sound producing means (Fig. 4) may be connected by means of a conduit 45a to the exhaust side of valve 43.

A suitable needle valve as in Fig. 1 may be provided for governing the flow of pressure agent through conduit 45, whereby the speed of piston 48 and thus the duration of the sound impulse is controlled.

Figure 5:
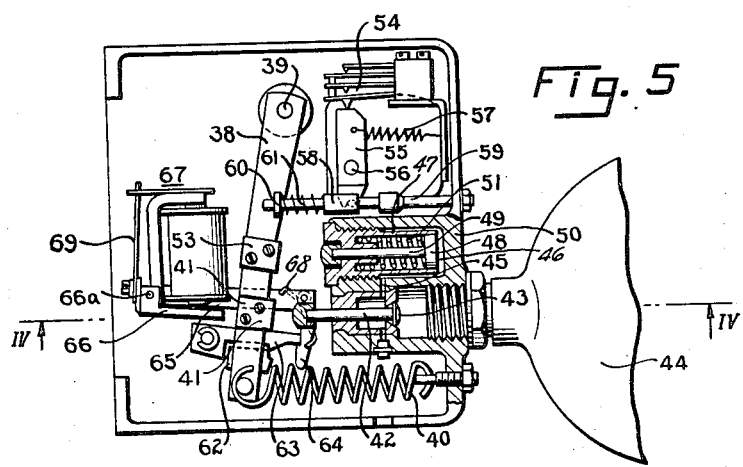
Fig. 5 is a sectional view taken in line V—V of Fig. 4.
Figures 6, 7:
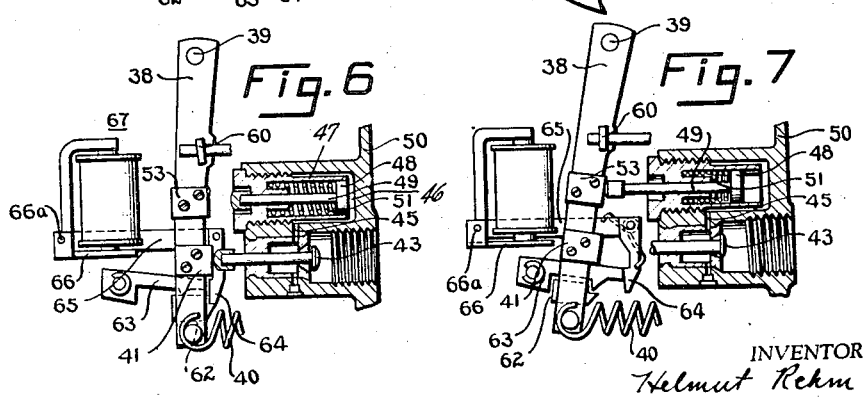
Fig. 6 is a view of the several moving elements shown in Fig. 5 in an operating position; and, Fig. 7 is a view of the parts shown in Fig. 6 in a second operating position.

It is desirable for a number of purposes to provide a switch, operable by lever 38, which may be either opened or closed during the period of the sound impulse. Use can be made of such a switch, for example, to actuate means which will prevent a sound receiver of the sonic altimeter from receiving the sound impulse while it is being produced. A switch 54 is provided for the above purpose and is actuated by means of a lever 55, pivotally mounted at 56 and yieldingly urged in a clockwise direction by a spring 57 attached above pivot 56. Below, said pivot lever 55 engages a sleeve 58 slidably mounted upon a rod 59 which loosely extends at one extremity thereof through a shoulder 60 upon lever 38. Interposed between said shoulder and sleeve is a coil spring 61 which surrounds rod 59 and urges lever 55 in a counter-clockwise direction. When the lever 38 is in the cocked position as shown in Fig. 5, the springs 57 and 61 balance one another and the switch is open. Compression of spring 61, however, will destroy this balance, to pivot the lever 55 and operate the switch 54.

Novel means are provided for retaining lever 38 in a cocked position which are effective to engage and retain the lever immediately when it is returned after a previous release, even while the releasing means are energized. The means comprise, in the form shown (Figs. 4–7), a catch portion 62 mounted upon lever 38 adjacent the free extremity thereof. Catch 62 is engageable by a pivotally mounted latch 63 which, in turn, is operated by a trigger portion 64. Trigger 64, in turn, is pivotally mounted upon a lever 65 which is attached to an armature 66 of an electromagnet 67. Trigger 64 is yieldingly urged in a clockwise direction by means of a spring 68. Armature 66 is pivotally mounted at 66a and yieldingly urged also in a clockwise direction, i. e., away from magnet 67, by a leaf spring 69.

In operation of this embodiment, electromagnet 67 is energized, armature 66 is attracted thereto and moves in a counterclockwise direction against the pressure of leaf spring 69. Lever 65 moves with said armature and lifts trigger portion 64 which is engaging latch 63 (Fig. 5). The lifting of said trigger will also lift the latch 63 which becomes disengaged from the catch portion 62 and releases lever 38 which is yieldingly drawn by spring 40 towards the valve rod 42. When lever 38 reaches the point where it opens valve 43 (Fig. 6), the catch portion 62 strikes and moves the pivotally mounted trigger 64 in a counter-clockwise direction whereby the latch 63 becomes disengaged therefrom and falls upon the upper smooth surface of the catch 62 but not in such a position that it will engage the same. With valve 43 open, the pressure agent flows from container 44 to sound the whistle 10a. Piston 48 is moved against the pressure of coil spring 51 and the rod 49 strikes and moves lever 38 in a direction opposite to its first movement whereby valve 43 is closed. The duration of the signal is governed by the needle valve (not shown) which controls the flow of pressure agent through conduit 45. If, at the instant that lever 38 is returned to its initial position, the electromagnet 67 is still energized, the parts will be in the position shown in Fig. 7. The trigger 64 will still be disengaged from latch 63. The latch, upon the return of lever 38, which lever carries the catch portion 62 thereon, will by gravity fall into and engage said catch regardless of the energized or deenergized condition of magnet 67. Consequently, a repetition of the above-described events will not occur. When electro-magnet 67 is deenergized, armature 66 and lever 65, with trigger 64, will pivot about 66a in a clockwise direction, whereby the trigger 64 will reengage the latch 63 and the parts again will assume the position shown in Fig. 5.

There is thus provided a novel sound impulse governing means wherein the duration of a sound impulse may be accurately controlled. The device is not complicated, and its manner of operation is simple. The apparatus is especially adapted for use with sonic altimeters for aircraft wherein it is necessary to produce sound impulses of very short duration at low altitudes and of longer duration at high altitudes. Not only is the speed at which the control valve moves controllable but the nature of its motion, i. e., uniform or intermittently slow and rapid, is also governable. The device is positive in operation, there being means for preventing undesired repetitions of sound impulses, and, furthermore, it requires only a small amount of space.

Although only two embodiments of the present invention have been illustrated and described in detail, it is to be expressly understood that the invention is not limited thereto. For example, in the embodiments shown, the valve opening lever is returned to its initial position by a piston rod which is actuated by a pressure medium acting upon a piston. However, suitable electrical return means which are energized by a pressure agent acting upon an electric switch may be employed instead. Various changes may also be made in the design and arrangement of parts without departing from the spirit and scope of the invention as the same will now be understood by those skilled in the art. For a definition of the limits of the invention, reference will be had primarily to the appended claims.

What is claimed is:

1. In a sound transmitter device for an aircraft sonic altimeter, fluid pressure operated sound producing means, a conduit in communication with said means for conducting fluid pressure thereto, a valve normally resiliently urged to a closed position in said conduit for preventing fluid pressure flow to said sound producing means, a valve rod mounting said valve for reciprocal movement within said conduit against said resilient action, actuating means including a hammer for engaging said valve rod to open said valve, means for releasably maintaining said actuating means in non-actuating position, whereby upon release of said actuating means said hammer engages said valve rod to urge said valve to an open position causing fluid pressure to flow to said sound producing means, means for actuating said last-named means to release said actuating means whereby said hammer engages said valve rod to open said valve, and means responsive to the fluid pressure in said conduit when said valve is open for disabling said actuating means and disengaging said hammer from said valve rod whereby said valve resumes its closed position.

2. In a sound transmitter device for an aircraft sonic altimeter, fluid pressure operated sound producing means, a conduit in communication with said means for conducting fluid pressure thereto, a valve normally resiliently urged to a closed position in said conduit for preventing fluid pressure flow to said sound producing means, a valve rod mounting said valve for reciprocal movement within said conduit against said resilient action, actuating means including a hammer for engaging said valve rod to open said valve, means for releasably maintaining said actuating means in non-actuating position whereby upon release of said actuating means said hammer engages said valve rod to urge said valve to an open position causing fluid pressure to flow to said sound producing means, means for actuating said maintaining means to release said actuating means whereby said hammer engages said valve rod to open said valve, means responsive to the fluid pressure in said conduit when said valve is open for disabling said actuating means and disengaging said hammer from said valve rod whereby said valve resumes its closed position, and means associated with said last-named means for governing the speed of operation of said last-named means.

3. In a sound transmitter device for an aircraft sonic altimeter, fluid pressure operated sound producing means, a conduit in communication with said means for conducting fluid pressure thereto, a valve normally resiliently urged to a closed position in said conduit for preventing fluid pressure flow to said sound producing means, a valve rod mounting said valve for reciprocal movement within said conduit against said resilient action, a pivoted hammer for engaging said valve rod to open said valve whereby fluid pressure flows to said sound producing means, and means comprising a plunger subjected to the pressure of said fluid when said valve is open for disengaging said hammer from said valve rod whereby said valve resumes its closed position.

4. In a sound transmitter device for an aircraft sonic altimeter, fluid pressure operated sound producing means, a conduit in communication with said means for conducting fluid pressure thereto, a control valve in said conduit normally resiliently urged to its closed position whereby fluid pressure is prevented from flowing to said sound producing means, a valve rod mounting said control valve for reciprocal movement within said conduit against said resilient action, a cylinder in communication with said conduit, a plunger in said cylinder, means for controlling the fluid pressure flow to said cylinder, and pivoted hammer means for engaging said valve rod to open said valve, said plunger being movable as a function of the pressure in said conduit when said valve is open to engage said pivoted hammer means whereby said valve rod is disengaged and said valve resumes its closed position.

5. In a sound transmitter for an aircraft sonic altimeter, fluid pressure sound producing means, a conduit in communication with said means for conducting fluid pressure thereto, a valve normally resiliently urged to a closed position in said conduit for preventing fluid pressure flow to said sound producing means, a valve rod mounting said valve for reciprocal movement within said conduit against said resilient action, a pivoted lever including a hammer resiliently urged in one direction to engage said valve rod and open said valve whereby fluid pressure flows to said sound producing means, a latch for holding said lever and hammer in another direction whereby said valve rod is disengaged and said valve is closed, and means including a plunger responding to the fluid pressure in said conduit when said valve is open for engaging and returning said lever to its latched position.

6. In a sound transmitter for an aircraft sonic altimeter, fluid pressure sound producing means, a conduit in communication with said means for conducting fluid pressure thereto, a valve normally resiliently urged to a closed position in said conduit for preventing fluid pressure flow to said sound producing means, a valve rod mounting said valve for reciprocal movement within said conduit against said resilient action, a pivoted lever resiliently urged to engage said valve rod so as to open said valve, a latch cooperating with said lever to lock the same, means for releasing said latch whereby said lever is resiliently urged to a position to engage said valve rod to open said valve whereby fluid pressure flows to said sound producing means, a cylinder in communication with said conduit, a plunger in said cylinder, means for controlling the flow of fluid pressure to said cylinder, and means connected with said plunger for engaging and moving the lever to locked position whereby said valve rod is disengaged and said valve assumes its closed position.

7. In a sound transmitter device for an aircraft sonic altimeter, fluid pressure sound producing means, a conduit in communication with said means for conducting fluid pressure thereto, a valve normally resiliently urged to a closed position in said conduit for preventing fluid pressure flow to said sound producing means, a valve rod mounting said valve for reciprocal movement within said conduit against said resilient action, actuating means including a hammer resiliently urged to engage said valve rod to open said valve whereby fluid pressure flows to said sound producing means, a cylinder having two bores of differing diameters, a piston in each of said bores, a piston rod mounting said pistons for movement in said cylinder, said cylinder being in communication with said conduit at a point between said pistons whereby fluid pressure flows to said cylinder when said valve is open to move said pistons whereby said piston rod engages said hammer, said valve moving to a closed position when said hammer is disengaged from said valve rod by said piston rod.

HELMUT REHM.
HANS SCHUCHMANN.